United States Patent
Wang et al.

(10) Patent No.: US 10,809,772 B1
(45) Date of Patent: Oct. 20, 2020

(54) ELECTRONIC DEVICE HAVING HINGE MECHANISM

(71) Applicant: Quanta Computer Inc., Taoyuan (TW)

(72) Inventors: Yen-Ching Wang, Taoyuan (TW); Chia-Heng Cheng, Taoyuan (TW); Chia-Fu Lu, Taoyuan (TW)

(73) Assignee: QUANTA COMPUTER INC., Guishan District, Taoyuan (TW)

( * ) Notice: Subject to any disclaimer, the term of this patent is extended or adjusted under 35 U.S.C. 154(b) by 0 days.

(21) Appl. No.: 16/728,372

(22) Filed: Dec. 27, 2019

(30) Foreign Application Priority Data

Sep. 9, 2019 (TW) .............................. 108132347 A (51) Int. Cl.
```
H05K 5/00      (2006.01)
G06F 1/16      (2006.01)
E05D 3/02      (2006.01)
E05D 7/00      (2006.01)
E05D 11/08     (2006.01)
```
(52) U.S. Cl.
CPC ............ *G06F 1/1681* (2013.01); *E05D 3/02* (2013.01); *E05D 7/0009* (2013.01); *E05D 11/082* (2013.01); *E05Y 2900/606* (2013.01); *G06F 1/1616* (2013.01)

(58) Field of Classification Search
CPC ........................................................ G06F 1/08
See application file for complete search history.

(56) References Cited

U.S. PATENT DOCUMENTS

2006/0048337 A1* 3/2006 Lowry .................... E05C 17/64
                                                    16/342
2010/0071161 A1* 3/2010 Wang .................... G06F 1/1616
                                                    16/339

FOREIGN PATENT DOCUMENTS

TW              275371           5/1996

OTHER PUBLICATIONS

Chinese language office action dated May 19, 2020, issued in application No. TW 108132347.
English translation of Chinese language office action dated May 19, 2020, issued in application No. TW 108132347.

* cited by examiner

Primary Examiner — Jerry Wu
(74) Attorney, Agent, or Firm — McClure, Qualey & Rodack, LLP (57) ABSTRACT

An electronic device is provided, including a base, a display module, and a hinge mechanism. The hinge mechanism connects the base and the display module, and includes a fixed member, an elastic piece assembly, a rotating shaft, and a locking assembly. The fixed member is fixed to the base, and the elastic piece assembly is disposed on the fixed member and has a through slot. The rotating shaft is disposed through the fixed member and the elastic piece assembly, and is connected to the display module. The locking assembly is disposed through the elastic piece assembly. When the locking assembly is locked into the through slot in a first direction, the locking assembly drives the elastic piece assembly to move toward and clamps the rotating shaft, wherein the elastic piece assembly applies a first clamping force to the rotating shaft.

9 Claims, 9 Drawing Sheets

ELECTRONIC DEVICE HAVING HINGE MECHANISM

CROSS REFERENCE TO RELATED APPLICATIONS

This application claims the benefit of Taiwan Application No. 108132347, filed on Sep. 9, 2019, the entirety of which is incorporated by reference herein.

BACKGROUND OF THE INVENTION

Field of the Invention

The application relates in general to an electronic device, and in particular to an electronic device that includes a hinge mechanism.

Description of the Related Art

Thanks to ongoing technological developments, recent electronic devices such as portable laptop computers have appeared on the market to provide people with more rapid and convenient service. A typical laptop computer usually has a screen and keyboard module, and the screen can be rotated relative to the keyboard module. The rotating shaft between the screen and the keyboard module needs stability testing, to provide better quality for the electronic devices. In view of this, how to provide a better shaft which can be tested under different testing conditions has become an important issue.

BRIEF SUMMARY OF INVENTION

To address the deficiencies of conventional products, an embodiment of the invention provides an electronic device, including a base, a display module, and a hinge mechanism. The display module is pivotally connected to the base, the hinge mechanism connects the base and the display module, and the display module is rotatable relative to the base. The hinge mechanism includes a fixed member, an elastic piece assembly, a rotating shaft, and a locking assembly. The fixed member is fixed to the base, and the elastic piece assembly is disposed on the fixed member and has a through slot. The rotating shaft is disposed through the fixed member and the elastic piece assembly, and is connected to the display module. The locking assembly is disposed through the elastic piece assembly. When the locking assembly is locked into the through slot in a first direction, the locking assembly drives the elastic piece assembly, and the elastic piece assembly moves toward the rotating shaft and clamps the rotating shaft, wherein the elastic piece assembly applies a first clamping force to the rotating shaft.

In some embodiments, when the locking assembly is moved away from the elastic piece assembly in a second direction, which is the opposite of the first direction, the locking assembly drives the elastic piece assembly to move away from the rotating shaft, and the elastic piece assembly applies a second clamping force to the rotating shaft, wherein the second clamping force is less than the first clamping force.

In some embodiments, the elastic piece assembly includes an upper elastic piece and a lower elastic piece disposed on the fixed member and arranged along the first direction, and when the locking assembly is locked into the through slot in the first direction, the lower elastic piece moves toward and approaches the upper elastic piece, and the upper elastic piece and the lower elastic piece clamp the rotating shaft.

In some embodiments, the upper elastic piece and the lower elastic piece correspond to each other and a gap is formed therebetween, and the upper elastic piece and the lower elastic piece have a Y-shaped structure when viewed from a direction of a central axis of the rotating shaft.

In some embodiments, the upper elastic piece has an upper opening, the lower elastic piece has a lower opening, and the upper opening and the lower opening constitute the through slot for the locking assembly to be locked in. The upper opening has a larger diameter than the lower opening.

In some embodiments, the locking assembly has a first threaded structure, the lower elastic piece has a second threaded structure, and the first threaded structure corresponds to the second threaded structure, wherein when the locking assembly is locked into the through slot in the first direction and the locking assembly drives the lower elastic piece by the first threaded structure matching the second threaded structure, the lower elastic piece moves toward the rotating shaft, and the elastic piece assembly clamps the rotating shaft.

In some embodiments, the electronic device further comprises a plurality of elastic piece assemblies disposed on the fixed member and clamping the rotating shaft, wherein the elastic piece assemblies are located at different positions on a central axis of the rotating shaft, wherein the locking assembly has a plurality of locking fasteners, and each locking fastener corresponds to the through slot of one of the elastic piece assemblies.

In some embodiments, when each locking fastener is locked into the corresponding through slot in the first direction, each elastic piece assembly moves toward the rotating shaft and clamps the rotating shaft.

In some embodiments, an end portion of the rotating shaft is riveted to the display module.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the optical systems are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
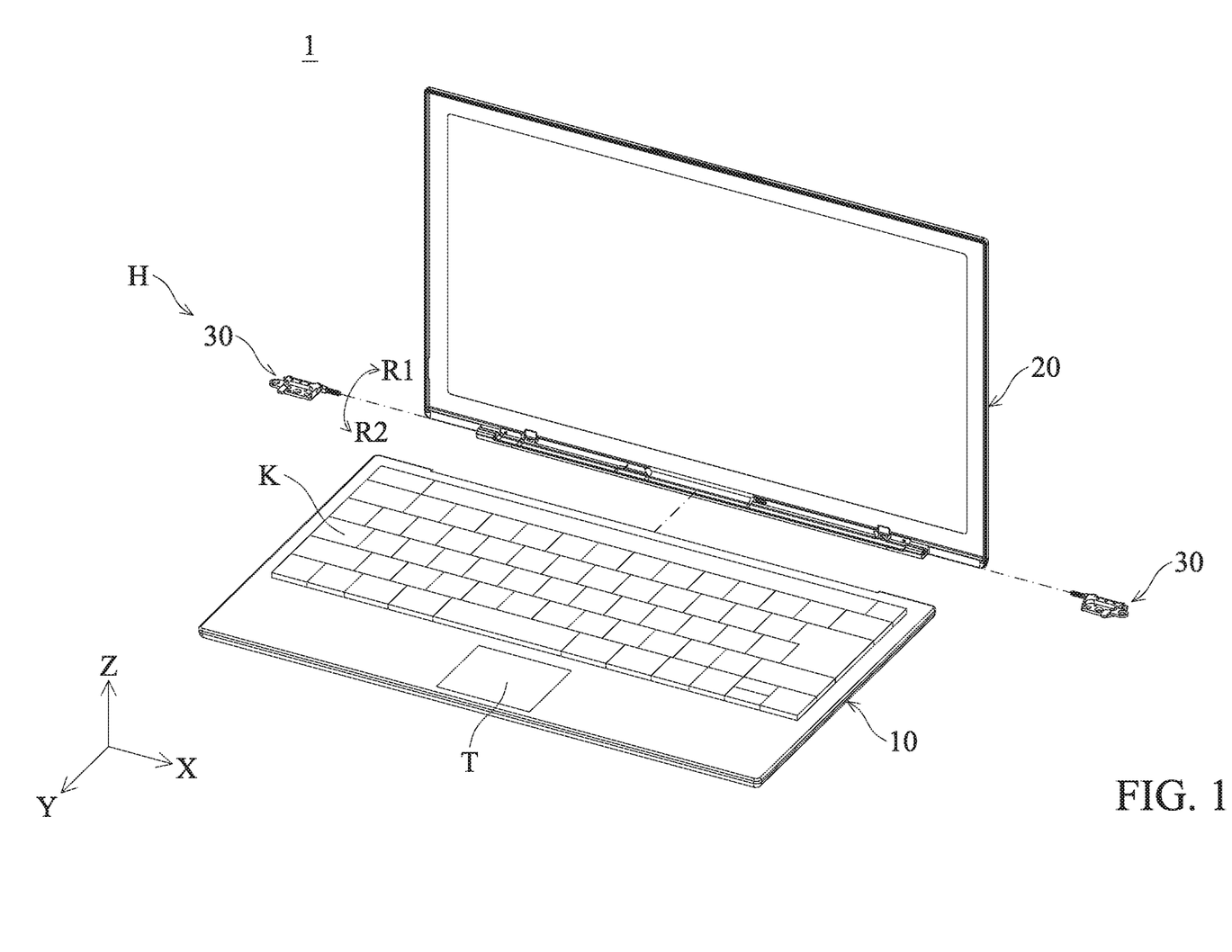
FIG. 1 is a schematic diagram of an electronic device according to an embodiment of the present invention.

FIG. 1 is a schematic diagram showing an electronic device 1 according to an embodiment of the present invention. As shown in FIG. 1, the electronic device 1, for example, can be a laptop computer, comprises a base 10, a display module 20, and a hinge module H. In some embodiments, the base 10 include an input module, such as having a keyboard module K and a touch panel T, and the display module 20 can be a display screen for displaying an image to a user. The display module 20 is connected to the base 10 in a movable and rotatable manner via the hinge module H, so that the electronic device 1 can be in a folded state or an open state. The display module 20 is pivotally connected to the base 10 by the hinge module H, and is rotatable relative to the base 10, such as the rotational directions R1 and R2 shown in FIG. 1.

In this embodiment, the hinge module H has two hinge mechanisms 30 respectively located on two sides of the base 10 (or the display module 20) for pivotally connecting the display module 20 and the base 10. In other embodiments, the hinge module H includes a single hinge mechanism 30 pivotally connected the display module 20 and the base 10, which also can achieve the function of rotating the display module 20 relative to the base 10. The structure of the aforementioned hinge mechanism 30 is described in detail below.

Figure 2:
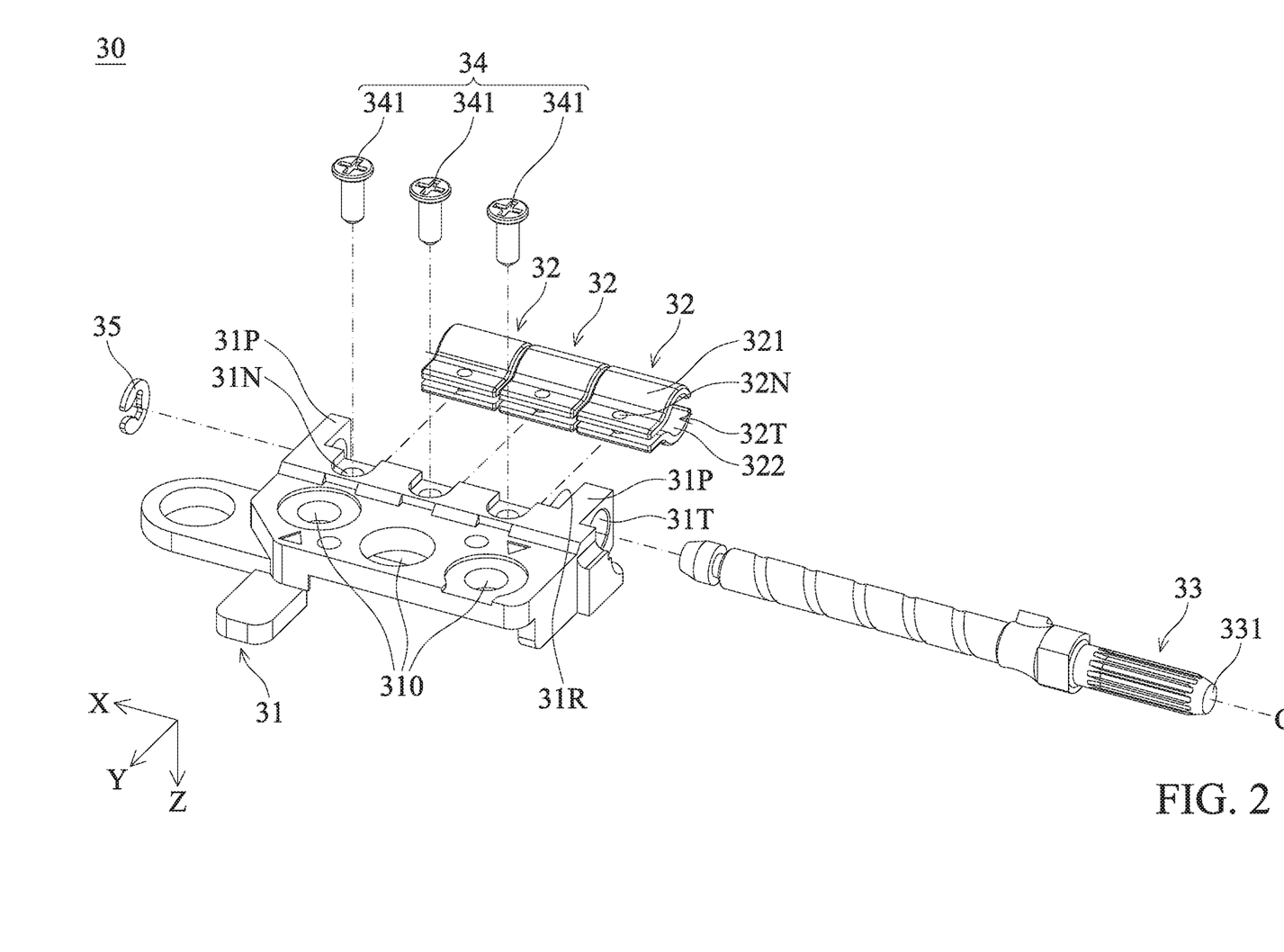
FIG. 2 is an exploded view diagram of one of hinge mechanisms (right side) in FIG. 1.
Figure 3:
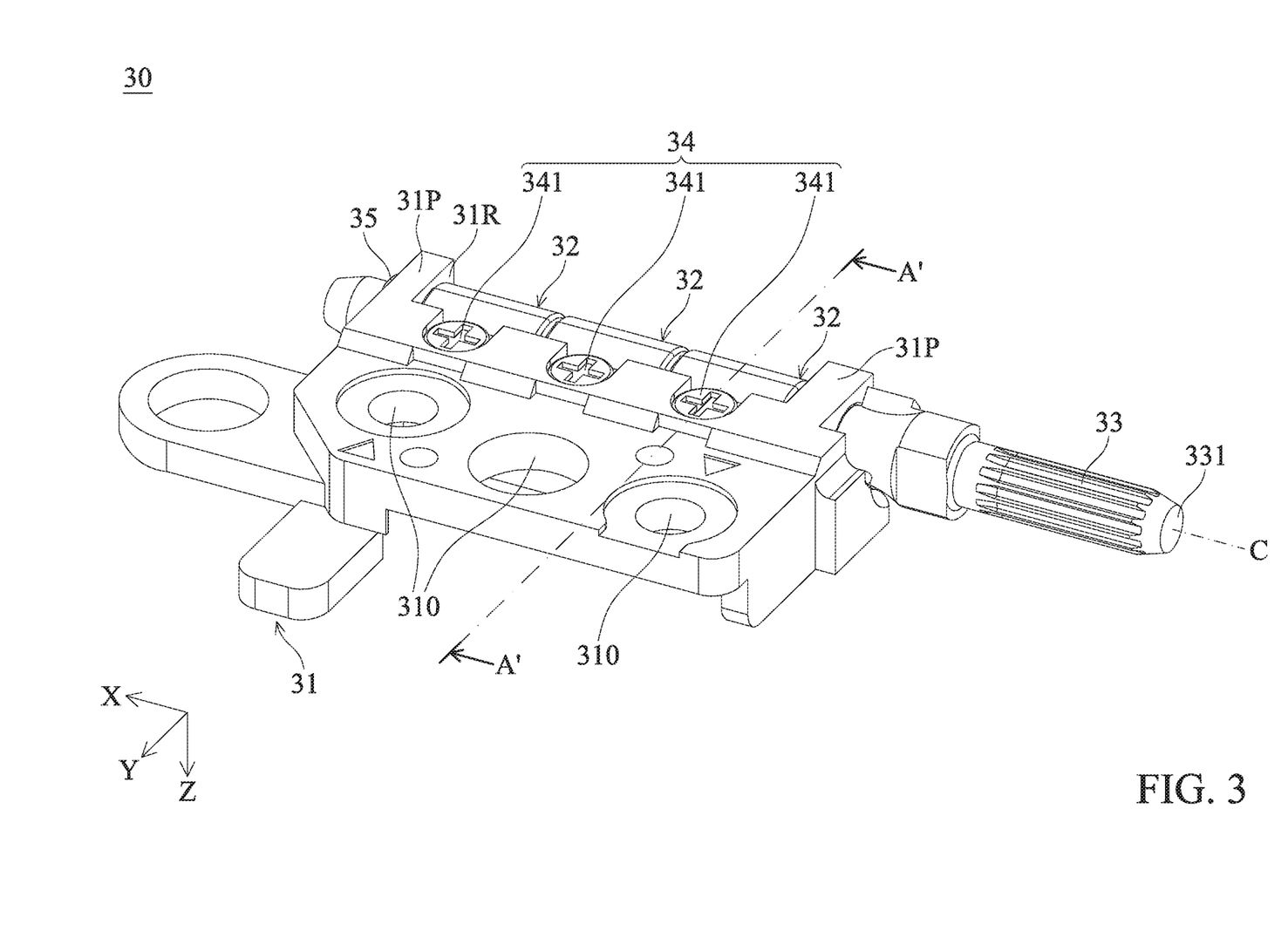
FIG. 3 is a schematic diagram of the hinge mechanism in FIG. 2 after assembly.

FIG. 2 shows an exploded view of the hinge mechanism 30, and FIG. 3 shows a schematic diagram of the hinge mechanism 30 in FIG. 2 after assembly. The hinge mechanism 30 can serve as a pivot shaft whose torsion can be adjustable. In this embodiment, the hinge mechanism 30 includes a fixed member 31, a plurality of elastic piece assemblies 32, a rotating shaft 33, a locking assembly 34 and a fixed ring 35.

Figure 4:
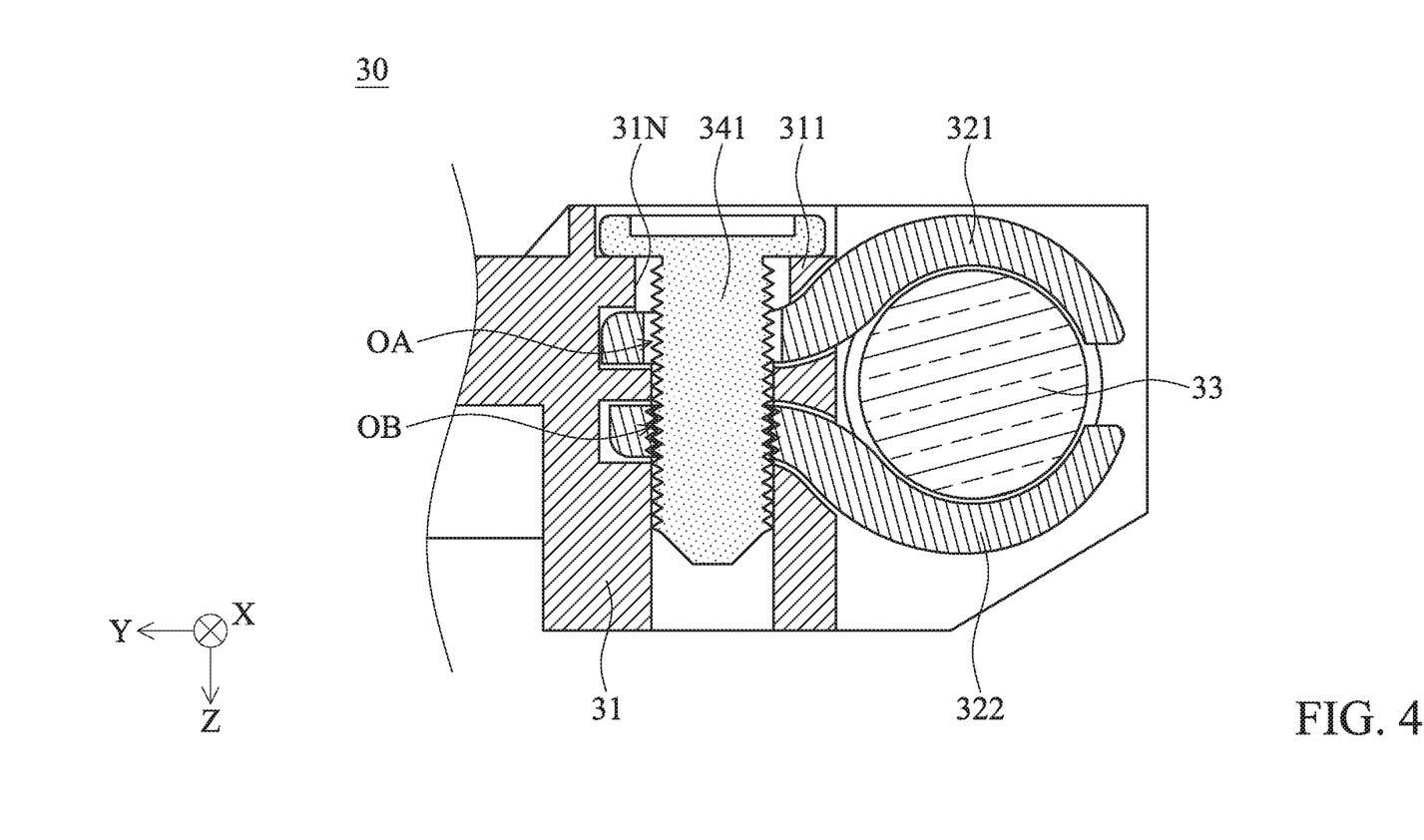
FIG. 4 is a cross-section view diagram taken along line A'-A' in FIG. 3.

The fixed member 31 is fixed to the base 10, and has a plurality of locking holes 310. Fasteners (for example, a screw, not shown) can be passed through the locking holes 310 and make the fixed member 31 fixed to the base 10. Each elastic piece assembly 32 has an elastic structure, and includes an upper elastic piece 321 and a lower elastic piece 322 which correspond to each other and form a through groove 32T (X-axis) therebetween, or form a gap therebetween (Z-axis). The upper and lower elastic pieces 321 and 322 are disposed in a recess 31R formed by the two protrusions 31P of the fixed member 31. For example, the upper and lower elastic pieces 321 and 322 are engaged within the main body of the fixed member 31. The upper elastic piece 321 and the lower elastic piece 322 form a Y-shaped structure when viewed from a direction of a central axis C (or a central axis C direction) of the rotating shaft 33 or viewed from a sectional view (FIG. 4).

The rotating shaft 33 is disposed through a through opening 31T of the protrusions 31P of the fixed member 31 and the each through groove 32T of the elastic piece assembly 32. In the present embodiment, an end portion 331 of the rotating shaft 33 is rivet bonding to the display module 20. The fixed ring 35 is disposed around another end of the rotating shaft 33 which is away from the display module 20, and the fixed ring 35 has a C-shaped structure for limiting the fixing member 31, so that the fixed member 31 being sliding or moving in the direction of the central axis C of the rotating shaft 33 can be avoided.

The aforementioned locking assembly 34 includes a plurality of locking fastener 341, such as screws having a threaded structure, configured to lock into the fixed member 31 and the elastic piece assembly 32. In detail, as shown in the cross-sectional views shown in FIGS. 4 and 5A, each of the locking fasteners 341 corresponds to one through hole 31N of the fixed member 31 and a through slot 32N of the elastic piece assembly 32. The upper elastic piece 321 has an upper opening OA, the lower elastic piece 322 has a lower opening OB, and the upper and lower openings OA and OB correspond to each other (on the Z axis) and constitute the aforementioned through slot 32N (or the through slot 32N includes upper opening OA and lower opening OB). Furthermore, the diameter of the upper opening OA is larger than the diameter of the lower opening OB. The locking fastener 341 has a first threaded structure M1, and the elastic piece assembly 32 has a second threaded structure M2 that are matched to each other.

Figure 5A:
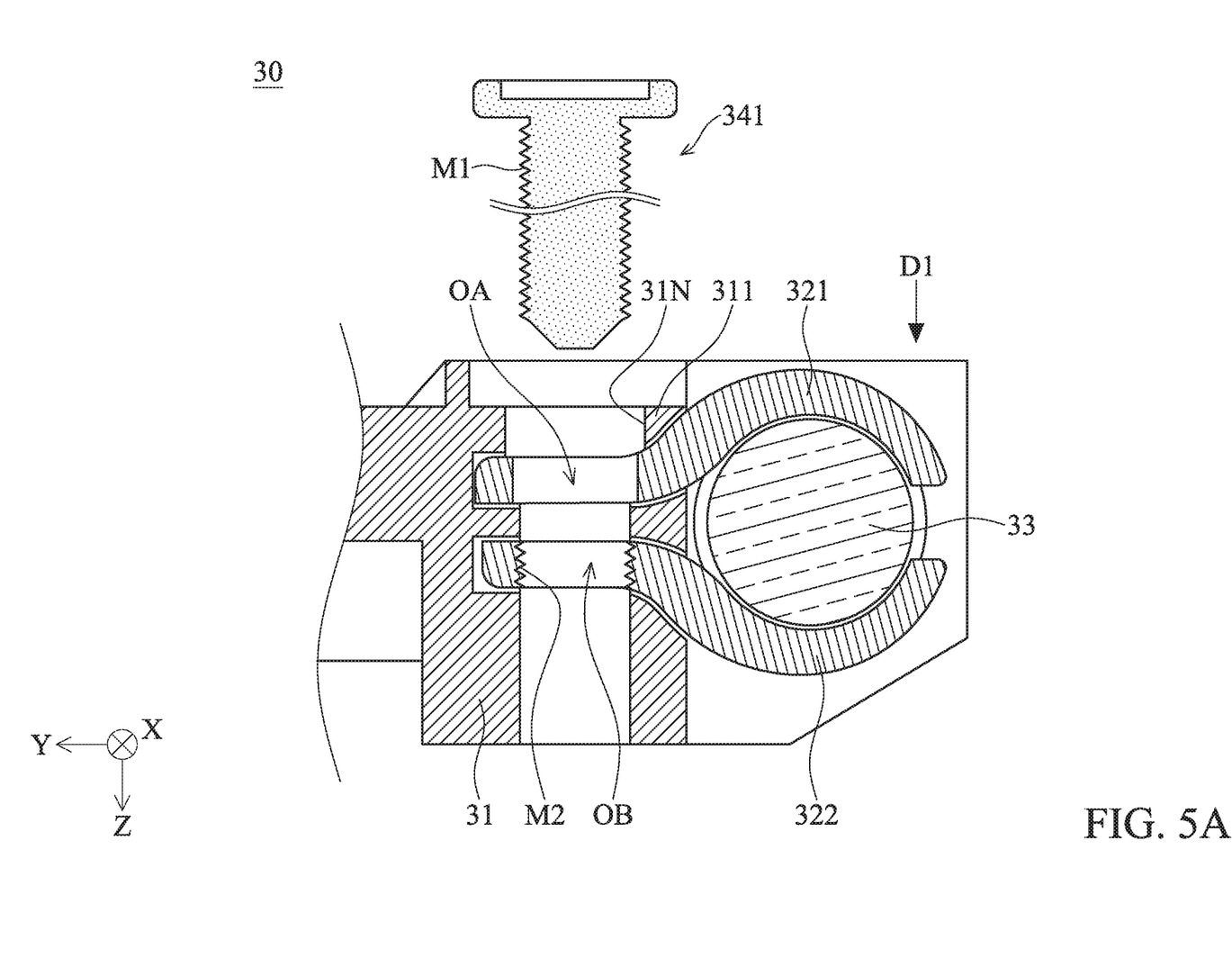
FIGS. 5A to 5C are schematic diagrams of the locking fastener entering the through hole and the through slot in the first direction.
Figure 5B:
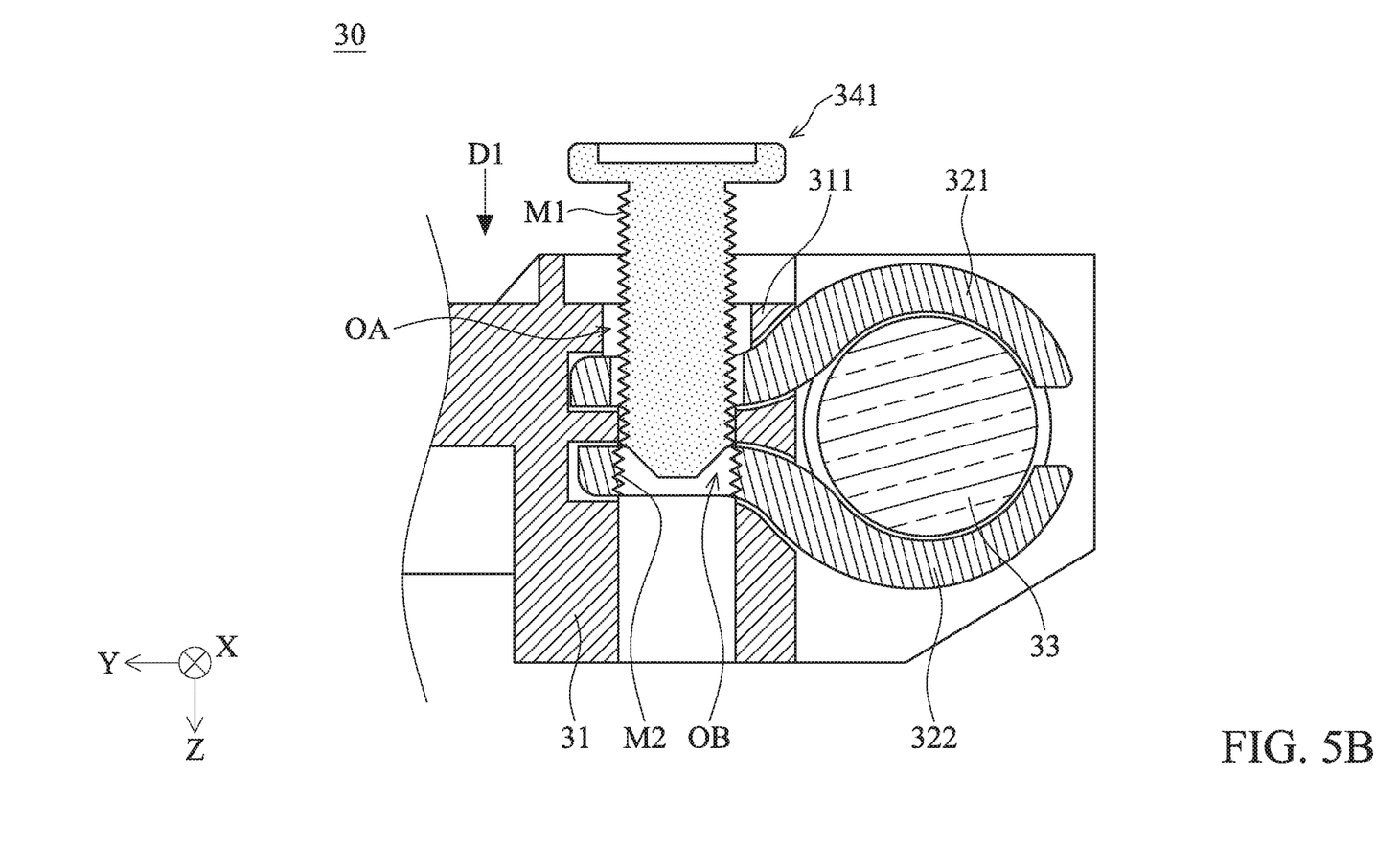
Figure 5C:
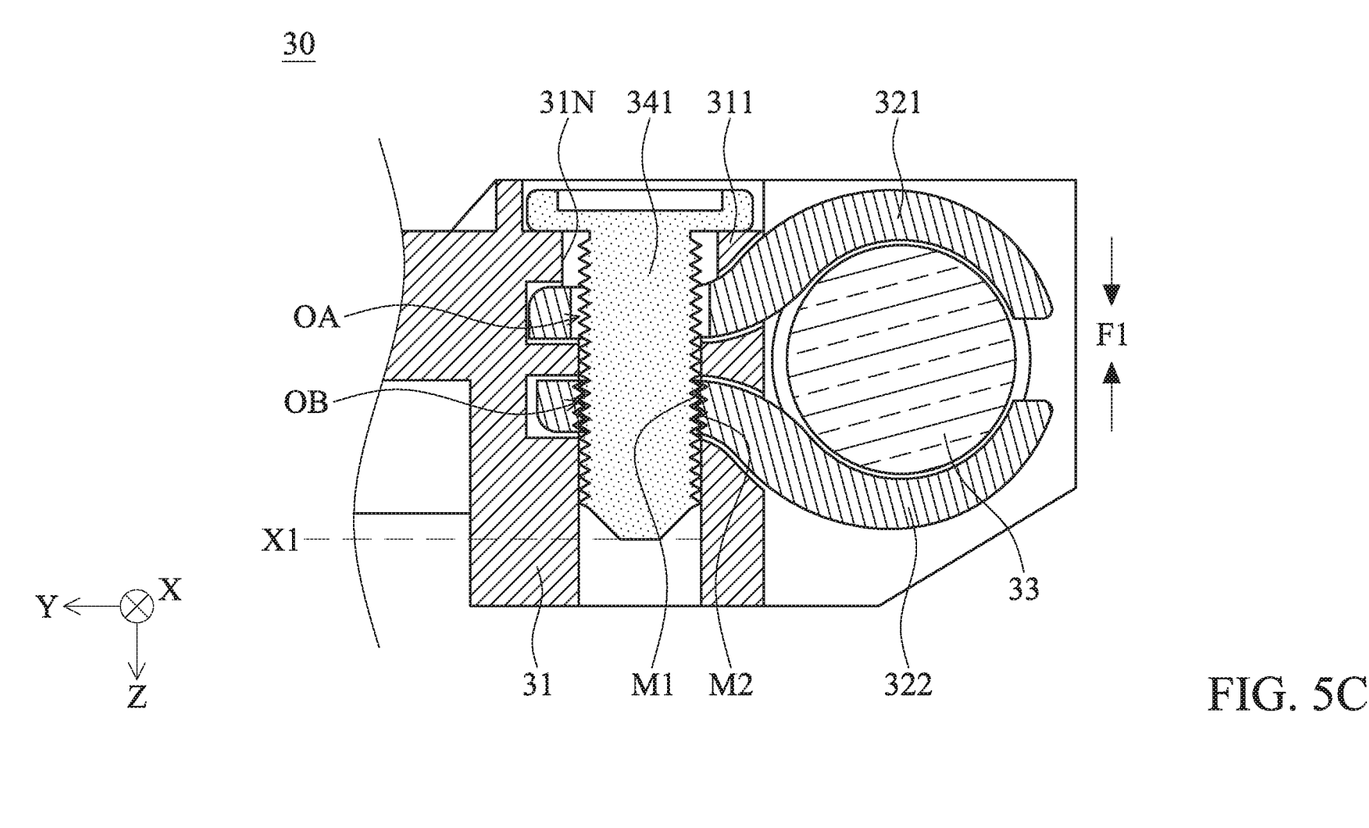

Please refer to FIGS. 5A-5B. In this embodiment, when the locking fastener 341 enters the through hole 31N along a first direction D1 and locks into the through slot 32N, it will pass through the upper opening OA firstly, and then in contact with the second thread structure M2 on the lower opening OB of the lower elastic piece 322. After then, when the locking fastener 341 continues to move (for example, via manner of rotational locking) in the first direction D1 to reach a first position X1 which is deepest position, as shown in FIG. 5C, since the first thread structure M1 of the locking fastener 341 is matched the second thread structure M2 of the lower elastic piece 322, it causes the locking fastener 341 to drive the lower elastic piece 322, and the lower elastic piece 322 is moved toward and approaches the rotating shaft 33. In other words, the lower elastic piece 32 is driven by the motion of locking of the locking fastener 341 (the upper elastic piece 321 is fixed and not move), so that the elastic piece assembly 32 can clamp the rotating shaft 33 tighter (as compared to when the locking fastener 341 is not inserted), and a first clamping force F1 is applied to the rotating shaft 33.

About the locking fastener 341 entering the through slot 32N and passing through the upper opening OA and the lower opening OB, the diameter of the lower opening OB is designed to match the locking fastener 341, and the diameter of the upper opening OA is larger than the diameter of the lower opening OB. In this way, the locking fastener 341 can be prevented from driving the upper elastic piece 321 to move up or vibrating the upper elastic piece 321 (when the locking fastener 341 passes through the upper opening OA) when the rotating shaft 33 is not tightened, due to the larger diameter of the upper opening OA.

Figure 5D:
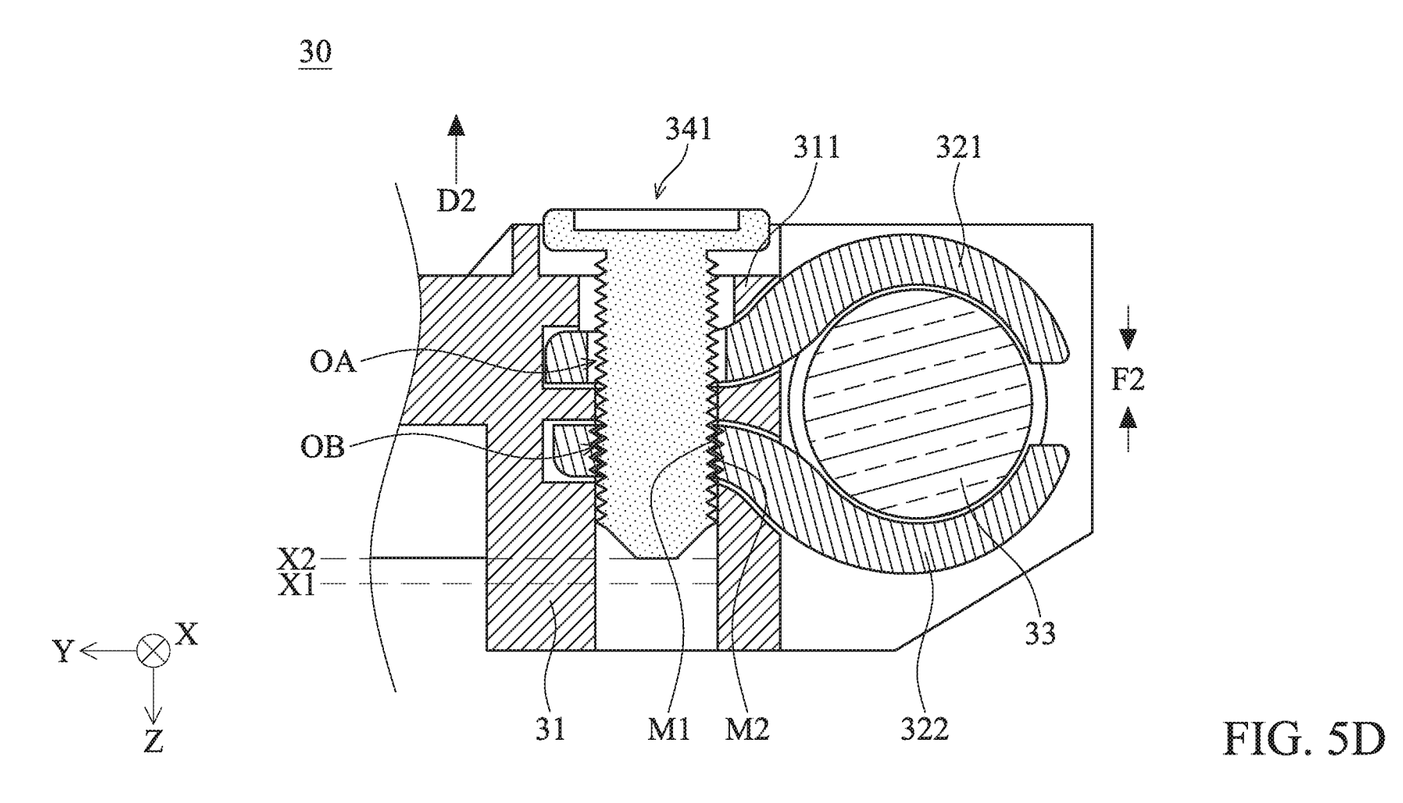
FIG. 5D is a schematic diagram of the locking fastener moving along the second direction.

Conversely, when the locking fastener 341 moves away from the rotating shaft 33, as shown in FIGS. 5C-5D, moving from the first position X1 to the second position X2 via the first and second thread structures M1 and M2, the lower elastic piece 322 moves away from the rotating shaft 33. At this time, the elastic piece assembly 32 applies a second clamping force F2 to the rotating shaft 33, and the elastic piece assembly 32 relatively loosely clamps the rotating shaft 33 (as compared with FIG. 5C). That is, the second clamping force F2 is smaller than the first clamping force F1.

In the present embodiment, the hinge mechanism 30 is provided with three elastic piece assemblies 32 and three locking fasteners 341, wherein the elastic piece assemblies 32 are located at different positions on the central axis C of the rotating shaft 33. Specifically, the elastic piece assemblies 32 are arranged along the central axis C. The degree of clamping for the rotating shaft 33 can be adjusted by driving the lower elastic piece 322 of each of the elastic piece assemblies 32 by each of the locking fasteners 341. In some embodiments, other numbers and sizes of elastic piece assemblies 32 may be configured, such as a larger two elastic piece assemblies, or a smaller four or five elastic piece assemblies.

Therefore, by adjusting the degree of clamping force for the rotating shaft 33 via the elastic piece member 32, the torsion of the display module 20 connected to the hinge mechanism 30 can be flexibly adjusted. In the product test for adjusting the rotational torque of the display module 20 relative to the base 10, if the torque value does not meet the standard, the degree of clamping the rotating shaft 33 can be easily adjusted by the aforementioned adjustment of the elastic member 32. This correction process is convenient and quick. In addition, compared with the traditional pivot riveted display module without the structure of adjusting the torque, when the torque value does not meet the standard, it can also avoid having to replace the entire display module and the pivot.

Figure 6:
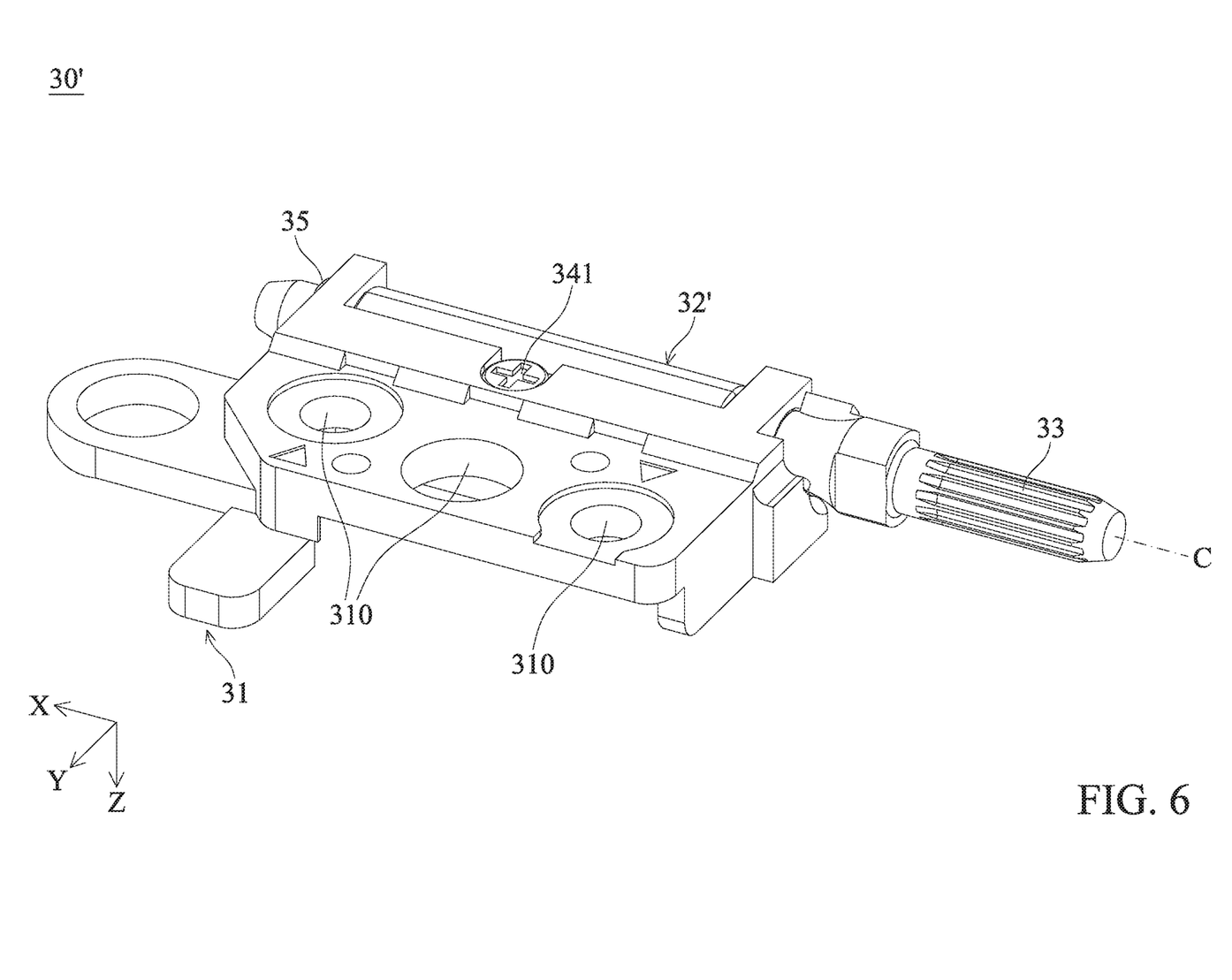
FIG. 6 is a schematic diagram of a hinge mechanism according to another embodiment of the present invention.

It should be understood that in some embodiments, only one elastic piece assembly 32 may be provided, or another one elastic piece assembly 32' that is larger than the elastic piece assembly 32 in FIG. 3 is provided, as shown in FIG. 6. This embodiment can also achieve the adjustment of the degree of clamping of the elastic piece assembly 32' to the rotating shaft 33, thereby adjusting the torque value of the hinge mechanism 30'.

In some variants of the embodiments, the configuration may be such that each of the locking fasteners 341 corresponds to only one elastic piece 321 or 322, and the body length of the locking fastener 341 corresponds to the bottom (near the center of the rotating shaft 33) of the upper opening OA (or the lower opening OB) of the upper elastic piece 321 (or the lower elastic piece 322), and does not touch another corresponding elastic piece, and both the upper and lower openings OA and OB have a threaded structure and is matched with the locking fasteners 341. One locking fastener 341 enters the upper opening OA from above to drive the upper elastic piece 321 to move in the first direction D1, and the rotating shaft 33 is also clamped in the first direction D1; the other one locking fastener 341 enters the lower opening OB from below to drive the lower elastic piece 322 to move in the second direction D2, the rotating shaft 33 is also clamped in the second direction D2. Thus, each elastic piece assembly 32 corresponds to two locking fasteners 341. With the different depth of entry of the locking fastener 341, the elastic piece assembly 33 can be adjusted to clamp the rotating shaft 33, so that the torque of the hinge mechanism 30 connected to the display module 20 can be adjusted more finely.

In summary, the present invention provides an electronic device, comprising a base, a display module and a hinge mechanism. The display module is pivotally connected to the base, the hinge mechanism connects the base and the display module, and the display module is rotatable relative to the base. The hinge mechanism includes a fixed member, an elastic piece assembly, a rotating shaft, and a locking assembly. The fixed member is fixed to the base, and the elastic piece assembly is disposed on the fixed member and has a through slot. The rotating shaft is disposed through the fixed member and the elastic piece assembly, and is connected to the display module. The locking assembly is disposed through the elastic piece assembly. When the locking assembly is locked into the through slot in a first direction, the locking assembly drives the elastic piece assembly, and the elastic piece assembly moves toward the rotating shaft and clamps the rotating shaft, wherein the elastic piece assembly applies a first clamping force to the rotating shaft.

The embodiment of the present invention has at least one of the following advantages or effects. The locking degree to the rotating shaft can be elastically adjusted through the locking assembly and the elastic piece assembly, so that the torque of the hinge module connected to the display module can be adjusted and calibrated. In the product test for adjusting the rotational torque of the display module relative to the base, if the torque value is not reached or exceeds or does not conform to the standard setting, the degree of clamping of the elastic piece assembly to the rotating shaft can be adjusted by changing the locking engagement of the locking assembly. This is convenient and quick to adjust, so that the entire product testing process can be perform more smoothly, and it can also be quickly calibrated during product repairs. In addition, compared with the traditional pivot riveted display module without the structure of adjusting the torque, when the torque value does not meet the standard, the entire display module and the pivot axis can be avoided. In addition, compared with the traditional pivot riveted display module without the torque adjusting mechanism, when the torque value does not meet the standard, the entire display module and the pivot shaft will not have to be withdrawn, in the embodiment of the present invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. An electronic device, comprising: a base; a display module, pivotally connected to the base; and a hinge mechanism, connecting the base and the display module, wherein the display module is rotatable relative to the base; wherein the hinge mechanism includes: a fixed member, affixed to the base; an elastic piece assembly having an upper and a lower elastic pieces formed a through groove, wherein the elastic piece assembly is disposed on a recess formed by two protrusions extending from the fixed member and has a through slot on each of the lower and upper elastic pieces; a rotating shaft, disposed through a through opening on each of the two protrusions of the fixed member and the through groove of the elastic piece assembly, and the rotating shaft is rotated with to the display module; and a locking assembly, disposed through the elastic piece assembly; when the locking assembly is locked into the through slot and a through hole on the fixed member in a first direction, the locking assembly drives the elastic piece assembly, and the elastic piece assembly moves toward the rotating shaft and clamps the rotating shaft, wherein the elastic piece assembly applies a first clamping force to the rotating shaft; and the upper elastic piece and the lower elastic piece are arranged along the first direction, and when the locking assembly is locked into the through slot in the first direction, the lower elastic piece moves toward and approaches the upper elastic piece, and the upper elastic piece and the lower elastic piece clamp the rotating shaft.

2. The electronic device as claimed in claim 1, wherein when the locking assembly is moved away from the elastic piece assembly in a second direction, which is the opposite of the first direction, the locking assembly drives the elastic piece assembly to move away from the rotating shaft, and the elastic piece assembly applies a second clamping force to the rotating shaft, wherein the second clamping force is less than the first clamping force.

3. The electronic device as claimed in claim 1, wherein the upper elastic piece and the lower elastic piece correspond to each other and a gap is formed therebetween, and the upper elastic piece and the lower elastic piece have a Y-shaped structure when viewed from a direction of a central axis of the rotating shaft.

4. The electronic device as claimed in claim 3, wherein the upper elastic piece has an upper opening, the lower elastic piece has a lower opening, and the upper opening and the lower opening constitute the through slot for the locking assembly to be locked in.

5. The electronic device as claimed in claim 4, wherein the upper opening has a larger diameter than the lower opening.

6. The electronic device as claimed in claim 1, wherein the locking assembly has a first threaded structure, the lower elastic piece has a second threaded structure, and the first threaded structure corresponds to the second threaded structure, wherein when the locking assembly is locked into the through slot in the first direction and the locking assembly drives the lower elastic piece by the first threaded structure matching the second threaded structure, the lower elastic piece moves toward the rotating shaft, and the elastic piece assembly clamps the rotating shaft.

7. The electronic device as claimed in claim 1, further comprising a plurality of elastic piece assemblies disposed on the fixed member and clamping the rotating shaft, wherein the elastic piece assemblies are located at different positions on a central axis of the rotating shaft, wherein the locking assembly has a plurality of locking fasteners, and each locking fastener corresponds to the through slot of one of the elastic piece assemblies.

8. The electronic device as claimed in claim 7, wherein when each locking fastener is locked into the corresponding through slot in the first direction, each elastic piece assembly moves toward the rotating shaft and clamps the rotating shaft.

9. The electronic device as claimed in claim 1, wherein an end portion of the rotating shaft is riveted to the display module.

\* \* \* \* \*